US005892647A

United States Patent [19]

Mizoe

[11] Patent Number: 5,892,647

[45] Date of Patent: Apr. 6, 1999

[54] OVERCURRENT DETECTION CIRCUIT

[75] Inventor: Kimiyoshi Mizoe, Nagano, Japan

[73] Assignee: Fuji Electric Co., Ltd., Kawasaki, Japan

[21] Appl. No.: 90,259

[22] Filed: Jun. 4, 1998

[30] Foreign Application Priority Data

Jun. 26, 1997 [JP] Japan .................................... 9-169973

[51] Int. Cl.$^6$ ........................................................ H02H 3/08

[52] U.S. Cl. ................................ 361/101; 361/18; 361/57

[58] Field of Search ..................................... 361/100, 101, 361/18, 93, 54, 55, 57

[56] References Cited

U.S. PATENT DOCUMENTS 5,233,287 8/1993 Lenk ......................................... 361/18

FOREIGN PATENT DOCUMENTS 4-295222 10/1992 Japan .

6-74981 3/1994 Japan .

*Primary Examiner*—Sally C. Medley
*Attorney, Agent, or Firm*—Kanesaka & Takeuchi

[57] ABSTRACT

An overcurrent detection circuit detects an overcurrent in a current path accurately and sensitively. The overcurrent detection circuit includes a first resistance element connected between first input and output terminals of the current path; a second resistance element connected to the first input terminal; a differential amplifying device connected to the first output terminal and the second resistance element; and a proportional-current output device connected to the second resistance element in series and to an output terminal of the differential amplifying device. The proportional-current output device receives an output signal from the differential amplifying device to output a proportional current with a magnitude proportional to a current flowing through the first resistance element. A current monitor device is connected to the proportional-current output device for monitoring the proportional current outputted from the proportional-current output device to detect an overcurrent flowing through the first resistance element.

10 Claims, 7 Drawing Sheets

OVERCURRENT DETECTION CIRCUIT

BACKGROUND OF THE INVENTION AND RELATED ART STATEMENT

The present invention relates to an overcurrent detection circuit that can be built in a semiconductor integrated circuit, and in particular, to an overcurrent detection circuit that detects an overcurrent status of a current flowing through a power supply line to protect a power supply circuit when there is an overload on a power supply apparatus.

In common methods for detecting an overcurrent through a power supply line, a resistor is inserted into the power supply line to monitor a voltage drop caused by a current flowing through the resistor.

FIGS. 12, 13 and 14 show specific examples of conventional overcurrent detection circuits based on such methods.

FIG. 12 shows a general series regulator, in which a portion composed of a resistor 114 and a transistor 115 detects an overcurrent. This overcurrent detection section 113 is a constant current limiting type.

A threshold where a current $I_1$ flowing through a power supply line 200 becomes excessive is referred to as $I_{over}$. When the current $I_1$ exceeds the threshold $I_{over}$, a voltage drop caused by the resistor 114 increases above a base-emitter voltage $V_{be}$ of a transistor 115, and the transistor 115 is operated to reduce a collector-emitter voltage $V_{ce}$. The base voltage of a power supply transistor 116 then decreases to reduce the variation of the current $I_1$ flowing through the collector, thereby increasing the collector-emitter voltage $V_{ce}$ of the transistor 116. In other words, an output voltage decreases.

Therefore, the overcurrent detection section 113 has a function for limiting a current $I_1$ flowing through the collector of the transistor 116 to protect the transistor 116 from damage caused by an overcurrent.

In FIG. 12, 111 is an input terminal; 112 is an output terminal; 117 and 118 are potential-dividing resistor; 119 is a reference voltage line; and 120 is an operational amplifier.

FIG. 13 shows a series regulator similar to that shown in FIG. 12 except for the configuration of the circuit of the overcurrent detection section. The overcurrent detection section 121 is composed of a transistor 115, a resistor 114, and resistors 122 and 123, and is a foldback current limiting type.

The overcurrent detection operation is almost the same as in the circuit in FIG. 12. A voltage drop caused by the resistor 114 activates the transistor 115, thereby reducing the base voltage of the power supply transistor 116. This operation reduces the output voltage, but the resistors 122 and 123 reduce the current $I_1$ to protect the transistor 116 from damage caused by an overcurrent.

FIG. 14 is a circuit whose function is to detect an overcurrent only.

When a load is low, a voltage drop caused by the resistor 114 is small, so that a negative input terminal of a comparator 127 has a voltage higher than that of a positive input terminal connected to a connection between a diode 124 and a resistor 125. Therefore, the output from the comparator 127 is in a "Low" level.

When the load increases and the current $I_1$ becomes the overcurrent $I_{over}$ to increase the voltage drop caused by the resistor 114 above the forward voltage $V_f$ of the diode 124, the voltage of the negative input terminal of the comparator 127 decreases to become less than the voltage of its positive input terminal. The output from the comparator reaches a "High" level, enabling an overcurrent to be detected.

The output from the comparator 120 is outputted from a detection terminal 126 as an overcurrent detection signal and is used to protect the power supply transistor on the input or output side.

In protecting a power supply transistor built in a regulator that is required to reduce the voltage between the output and input sides to 1 V or less, or a switching transistor inserted into a power supply line for switch-on and -off, the overcurrent can not be detected easily based on the voltage drop caused by the resistor as shown in FIGS. 12 to 14. Two possible causes are shown below.

First, in considering the voltage drop in a transistor, the voltage drop caused by a resistor connected in series to the transistor must be limited to 0.5 V or less in order to detect an overcurrent. Therefore, the base-emitter voltage $V_{be}$ of a bipolar transistor or the forward voltage $V_f$ of a diode can not be used as a reference voltage, and a reference voltage having a certain degree of accuracy can not be obtained.

Second, to reduce the voltage drop caused by the resistor, the resistance value is set to be 1 Ω or less when the output current becomes 100 mA or more. Therefore, the voltage drop caused by the resistor hardly varies in response to a small variation in an output current, thereby reducing the sensitivity for an overcurrent detection.

Due to these two points, the overcurrent detection using the voltage drop caused by the resistor generally has a low detection accuracy and is subject to variation or scattering. Furthermore, if an on-resistance of the power supply transistor or switching transistor is lower than the overcurrent detection resistance, this magnitude of the overcurrent detection resistance affects the voltage drop in the entire circuit including the transistor, thereby increasing losses relating to the voltage drop caused by the resistor.

Therefore, an object of the present invention is to provide an overcurrent detection circuit having a higher detection accuracy than the prior art.

Another object of the invention is to provide an overcurrent detection circuit that minimizes power losses.

SUMMARY OF THE INVENTION

A basic circuit diagram showing a first aspect of the invention is explained with reference to FIG. 1.

In this invention, a first resistor 4 is inserted into a power supply line 200 between an input terminal 1 and an output terminal 2, and one end of a resistance element 5 is connected to an input terminal side of the resistance element 4. Other ends of the resistance elements 4 and 5 are connected to two input terminals of differential amplifying means 6, such as an operational amplifier. The first and second resistance elements may be passive resistors or MOSFETs.

In addition, proportional-current output means 7 formed of a transistor is connected to one input terminal of the differential amplifying means 6 or to the second resistance element 5 in series. An output terminal of the differential amplifying means 6 is connected to a control terminal (base or gate) of the proportional-current output means 7. The proportional-current output means 7 may be a bipolar transistor or a MOSFET.

Furthermore, current monitor means 8 is connected to the output side of the proportional-current output means 7 so that an overcurrent detection signal output terminal 3 can be drawn from the current monitor means 8. The current monitor means 8 may have a comparator or a current comparison circuit.

According to this configuration, the circuit including the first and second resistance elements 4 and 5, the differential amplifying means 6, and the proportional-current output means 7 is used to obtain a proportional current $I_2$ proportional to the magnitude of the current $I_1$ flowing through the power supply line 200.

If a resistance value ($r_2$) of the second resistance element 5 is assumed to be (n) times as high as a resistance value ($r_1$) of the first resistance element 4, the proportional current $I_2$ obtained is 1/n of the current $I_1$ flowing through the power supply line 200. Therefore, the current monitor means 8 is used to convert the proportional current $I_2$ into a voltage and compare this voltage with a reference voltage, or to compare the proportional current $I_2$ with a reference current, so that the current $I_1$ flowing through the power supply line 200 is monitored in order to detect an over-current status.

The operation of this invention is described below in detail.

In the basic circuit in FIG. 1, a circuit for obtaining the proportional current $I_2$ proportional to the current $I_1$ through the power supply line 200 is described. Since the voltage drop caused by the resistance element 4 while the current $I_1$ is flowing is determined by $I_1 \times r_1$, the input voltage $V_1$ ($=V_o$) of the differential amplifying means 6 is expressed by Equation 1.

$$V_1 = V_1 - I_1 \cdot r_1 \qquad \text{Equation 1}$$

If the differential amplifying means 6 and the proportional-current output means 7 operate in such a way that the two inputs of the differential amplifying means 6 are subjected to an imaginary short, Equation 2 is established.

$$V_1 = V_2 \qquad \text{Equation 2}$$

If the proportional current obtained is $I_2$, the voltage drop caused by the resistor element 5 is determined by $I_2 \times r_2$ and $V_2$ is given by Equation 3.

$$V_2 = V_1 - I_2 \cdot r_2 \qquad \text{Equation 3}$$

Equation 4 is derived from Equations 1, 2 and 3.

$$V_1 - I_1 \cdot r_1 = V_1 - I_2 \cdot r_2 \qquad \text{Equation 4}$$

$$I_1 \cdot r_1 = I_2 \cdot r_2$$

$$I_2 = (r_1 / r_2) \cdot I_1$$

The resistance value $r_2$ of the resistance element 5, as shown in Equation 5 below, is assumed to be (n) times as high as the resistance value $r_1$ of the resistance element 4.

$$r_2 = n \times r_1 \qquad \text{Equation 5}$$

Equation 6 is derived from Equations 4 and 5.

$$I_2 = I_1 / n \qquad \text{Equation 6}$$

Therefore, the current $I_2$ proportional to the magnitude of the current $I_1$ through the power supply line 200 can be obtained.

When a threshold for the overcurrent flowing through the power supply line 200 is referred to as $I_{over}$, the proportional current $I_2$ is expressed by Equation 7.

$$I_2 = I_{over} / n = I_{dct} \qquad \text{Equation 7}$$

The current monitor means 8 compares the proportional current $I_2$ with a reference current $I_{ref}$. When the following Equation 8 is established, the current monitor means 8 determines that the current $I_1$ flowing through the power supply line 200 has an overcurrent status and outputs an overcurrent detection signal from the overcurrent detection signal output terminal 3.

$$I_2 (= I_{dct}) > I_{ref} \qquad \text{Equation 8}$$

In addition, if the current monitor means 8 converts the proportional current $I_2$ into a detected voltage and compares the detected voltage with a reference voltage $V_{ref}$, and when the resistance value used in converting a current into a voltage is referred to as R, the current monitor means 8 determines that the current $I_1$ flowing through the power supply line 200 is an overcurrent status when the following Equation 9 is established, and then outputs the overcurrent detection signal from the overcurrent detection signal output terminal 3.

$$I_2 \cdot R (= I_{dct} \cdot R) > V_{ref} \qquad \text{Equation 9}$$

The invention set forth in the first aspect is further embodied by second to ninth aspects.

First, according to the second aspect of the invention, the first and second resistance elements 4 and 5 in FIG. 1 are first and second passive resistors; the differential amplifying means is an operational amplifier; and the proportional-current output means 7 is a transistor such as a bipolar transistor or a MOSFET. An output signal from the operational amplifier is applied to a control terminal of the proportional-current output means, and the current monitor means 8 has a comparator for outputting an overcurrent detection signal depending on the result of a comparison between a reference voltage and a detected voltage obtained by converting the proportional current using a third passive resistor.

According to the third aspect of the invention, in an overcurrent detection circuit according to the second aspect, the reference voltage for the comparator is generated by using the reference current and a fourth passive resistor that is formed of the same components, i.e. having the same temperature characteristic, as the third passive element.

According to the fourth aspect of the invention, in an overcurrent detection circuit according to the first aspect, the first and second resistance elements 4 and 5 are first and second passive resistors; the differential amplifying means 6 is an operational amplifier; and the proportional-current output means 7 is a transistor, such as a bipolar transistor or a MOSFET. An output signal from the operational amplifier is applied to a control terminal of the proportional-current output means, and the current monitor means 8 is composed of a current comparison circuit for outputting an overcurrent detection signal depending on the result of a comparison between the proportional current and a reference current.

According to the fifth aspect of the invention, in an overcurrent detection circuit according to the first aspect, the first and second resistance elements 4 and 5 are first and second MOSFET switches; the differential amplifying means 6 is an operational amplifier; and the proportional-current output means 7 is a transistor, such as a bipolar transistor or a MOSFET. An output signal from the operational amplifier is applied to a control terminal of the proportional-current output means, and the current monitor means 8 has a comparator for outputting an overcurrent detection signal depending on the result of a comparison between a reference voltage and a detected voltage obtained by converting the proportional current using a passive resistor. The current monitor means has a function for shutting off the overcurrent by turning the first and second MOSFET switches off in response to the overcurrent detection signal outputted from the comparator.

According to the sixth aspect of the invention, in an overcurrent detection circuit according to the first aspect, the first and second resistance elements 4 and 5 are first and second MOSFET switches; the differential amplifying means 6 is a first operational amplifier; and the proportional-current output means 7 is a transistor, such as a bipolar transistor or a MOSFET. An output signal from the operational amplifier is applied to a control terminal of the proportional-current output means, and the current monitor means 8 is composed of a current comparison circuit for outputting an overcurrent detection signal depending on the result of a comparison between the proportional current and a reference current.

The current monitor means has a function for shutting off the overcurrent by turning the first and second MOSFET switches off in response to the overcurrent detection signal outputted from the current comparison circuit.

According to the seventh aspect of the invention, in an overcurrent detection circuit according to the first aspect, the first and second resistance elements 4 and 5 are first and second MOSFET switches; the differential amplifying means 6 is a first operational amplifier; and the proportional-current output means 7 is a transistor, such as a bipolar transistor or a MOSFET. An output signal from the first operational amplifier is applied to a control terminal of the proportional-current output means, and the current monitor means 8 has a second operational amplifier operative for outputting an overcurrent detection signal using, as an input, a reference voltage and a detected voltage obtained by converting the proportional current using the passive resistor, and for limiting a current flowing through the first MOSFET switch to a specified value.

According to the eighth aspect of the invention, in an overcurrent detection circuit according to the fifth or seventh aspect, the reference voltage is generated by using a reference current and another passive resistor formed of the same component, i,e. having the same temperature characteristic, as the passive resistor used to obtain the detected voltage.

According to the ninth aspect of the invention, in an overcurrent detection circuit according to the first aspect, the first and second resistance elements 4 and 5 are first and second MOSFET switches; the differential amplifying means 6 is an operational amplifier; and the proportional-current output means 7 is a transistor, such as a bipolar transistor or a MOSFET. An output signal from the operational amplifier is applied to a control terminal of the proportional-current output means, and the current monitor means 8 has a current differential amplifier, such as Norton amplifier, operative for outputting an overcurrent detection signal using, as an input, the proportional current and a reference current, and for limiting a current flowing through the first MOSFET switch to a specified value.

DETAILED DESCRIPTION OF PREFERRED EMBODIMENTS

Embodiments of this invention are described below with reference to the drawings.

Figure 2:
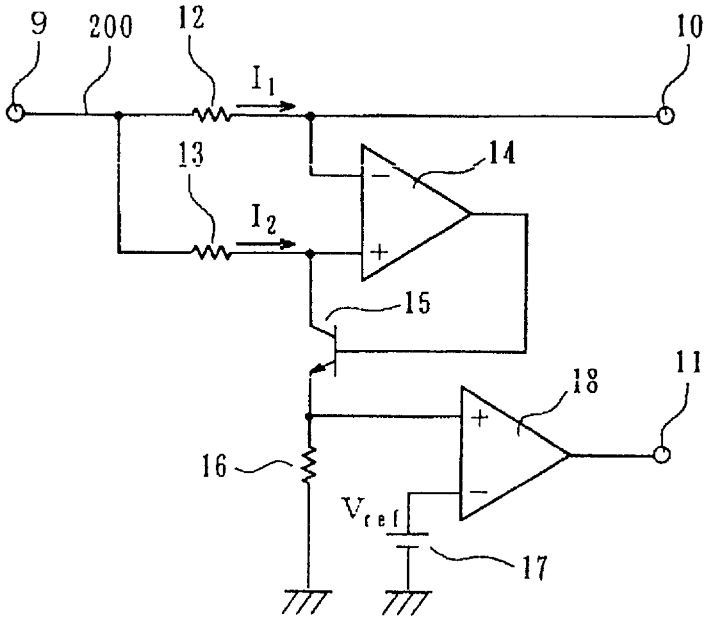
FIG. 2 is a circuit diagram showing a first embodiment of the invention.

FIG. 2 shows a first embodiment of the invention corresponding to an embodiment of the invention set forth in the second aspect.

Figure 1:
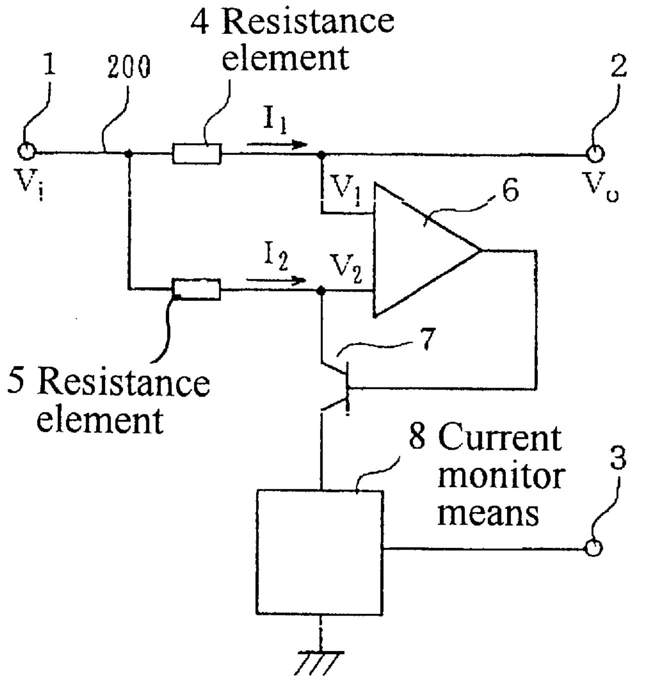
FIG. 1 is a circuit diagram corresponding to the invention set forth in a first aspect of the invention.

This embodiment uses first and second passive resistors 12 and 13 as the first and second resistance elements 4 and 5 in FIG. 1, an operational amplifier 14 as the differential amplifying means 6 in FIG. 1, an NPN transistor 15 as the proportional-current output means 7 in FIG. 1, comparator means 18 as the current monitor means 8 in FIG. 1, a third passive resistor 16, and a reference voltage source 17.

One end of the resistor 12 is connected to a negative input terminal of the operational amplifier 14 while one end of the resistor 13 is connected to a positive input terminal of the operational amplifier 14 in order to obtain a current $I_2$ proportional to the current $I_1$. The current monitor circuit converts the proportional current $I_2$ into a voltage using a passive resistor 16 connected to the NPN transistor 15, and the comparator 18 compares this detected voltage with the reference voltage $V_{ref}$ to detect the overcurrent status.

Reference numeral 9 designates an input terminal, 10 is an output terminal, and 11 is an overcurrent detection signal output terminal.

According to this embodiment, in case the resistance value of the third passive resistor 16 is referred to as R, if Equation 6 above is established, the output from the comparator 18 reaches a high level and an overcurrent detection signal for the current $I_1$ flowing through the power supply line 200 is outputted.

Figure 3:
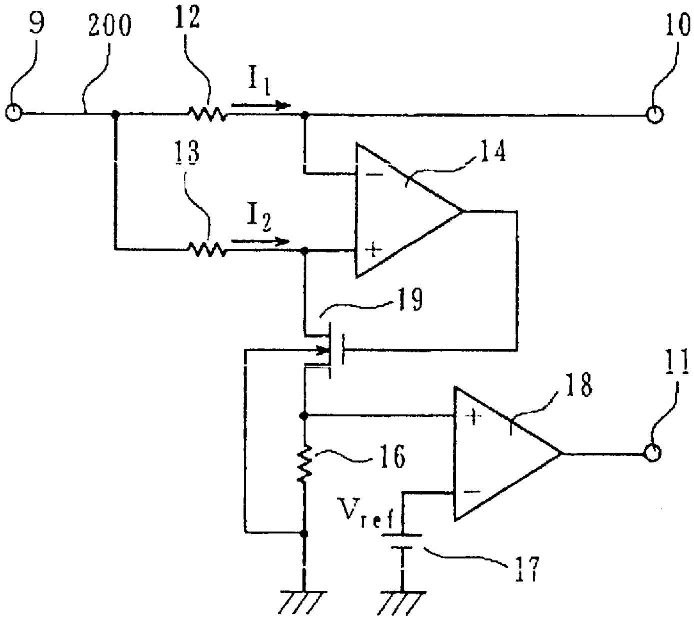
FIG. 3 is a circuit diagram showing a second embodiment of the invention.

FIG. 3 shows a second embodiment of this invention, which also corresponds to the invention set forth in the second aspect.

In this embodiment, an N channel MOSFET 19 is replaced with the NPN transistor 15 in FIG. 2. Otherwise, the configuration is the same as shown in FIG. 2, and same devices have the same reference numerals.

As is apparent from this embodiment, the proportional-current output means 7 may be composed of a bipolar transistor or a MOSFET. In all embodiments shown in FIG. 4 and subsequent figures, the part corresponding to the proportional-current output means 7 in FIG. 1 comprises a MOSFET but may be replaced with a bipolar transistor as in FIG. 2.

Figure 14:
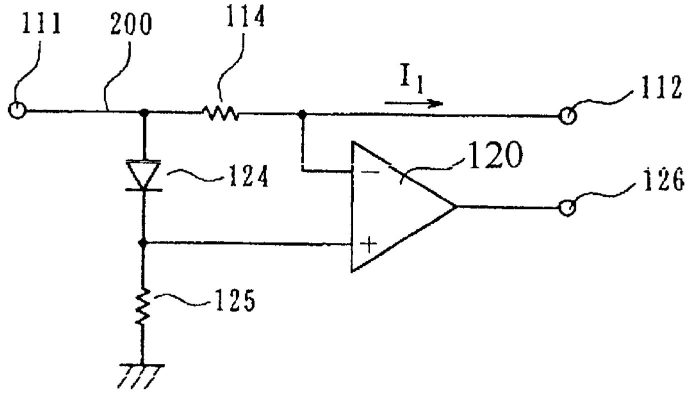
Fig. 14 Prior Art

With reference to the embodiment in FIG. 3, the detection accuracy and sensitivity to variations in the current flowing through the power supply line 200 are described in comparison with the prior art shown in FIG. 14. A diode 124 in FIG. 14 is assumed to be replaced with a voltage source having a voltage drop of 0.1 V.

In both FIGS. 14 and 3, the resistance value of resistors 124 and 12 used to detect an overcurrent flowing through the power supply line 200 is assumed to be 0.1 Ω and the threshold $I_{over}$ for overcurrent detection is assumed to be 1 A.

The current $I_1$ flowing through the power supply line 200 is assumed to vary by 10% of the threshold $I_{over}$. Ten percent of $I_{over}$ is equivalent to 100 mA. In the conventional circuit in FIG. 14, the voltage drop caused by the resistor 114 varies by 10 mV when the current $I_1$ varies by 100 mA.

In the circuit in FIG. 3 according to this embodiment, if the proportional current $I_2$ is reduced to 1/10,000 of the current $I_1$ flowing through the power supply line 200 and the resistance value of the resistor 16 is set at 10 kn, in case $I_1$ varies for 100 mA, $I_2$ varies for 10 $\mu$A increasing the voltage drop caused by the resistor 16 up to 100 mV.

In case the same element is used for a comparator 120 in FIG. 14 and the comparator 18 in FIG. 3, if variations in input voltages equivalent to 10 and 100 mV are to be detected, the comparator is more sensitive to detect 100 mV.

That is, this embodiment is more sensitive to variations in current than the prior art, and can improve detection accuracy.

Figure 4:
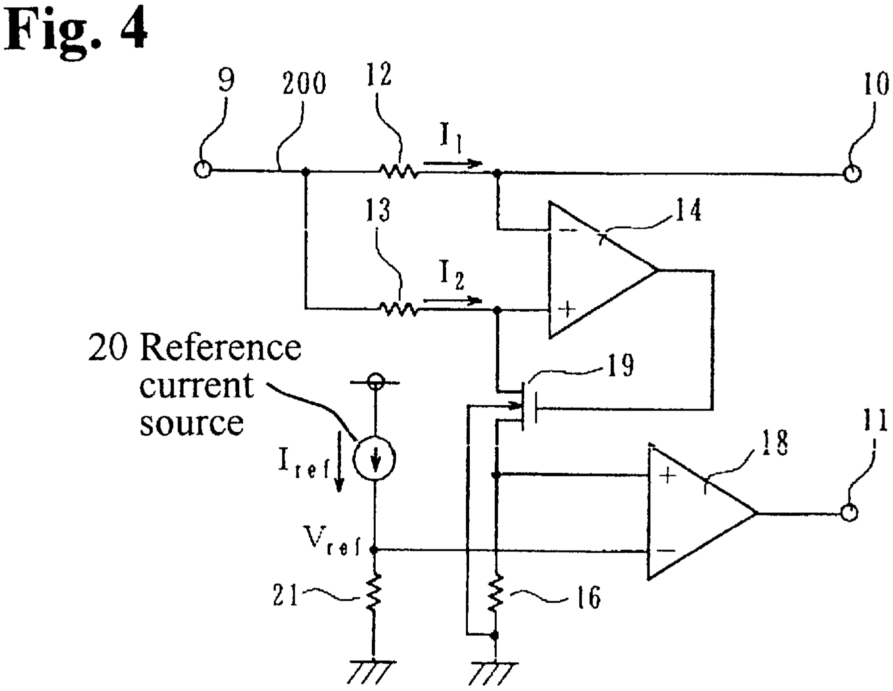
FIG. 4 is a circuit diagram showing a third embodiment of the invention.

This effect can be obtained not only by the embodiment in FIG. 2, but also by the embodiments in FIG. 4 and subsequent figures.

FIG. 4 shows a third embodiment corresponding to an embodiment of the invention as set forth in the third aspect.

The circuit for obtaining the proportional current $I_2$ according to this embodiment is the same as disclosed in FIG. 3, and this embodiment differs from the second embodiment in that the reference voltage $V_{ref}$ for the current monitor circuit is obtained by using a reference current source 20 and a fourth passive resistor 21 made of the same components as those of the passive resistor 16. According to this embodiment, the comparator compares the reference voltage $V_{ref}$ with a detected voltage obtained by means of conversion using the proportional current $I_2$ and the resistor 16 in order to detect an overcurrent.

In case the reference voltage $V_{ref}$ is generated by using the reference current $I_{ref}$ and the resistor 21, if the variation in temperature causes few variations in the reference current $I_{ref}$, the variation of the overcurrent detection accuracy caused by the variation in temperature can be reduced because the resistor 21 used to generate the reference voltage and the resistor 16 used to detect the proportional current $I_2$ are made of the same components and thus have the same temperature characteristics.

Figure 5:
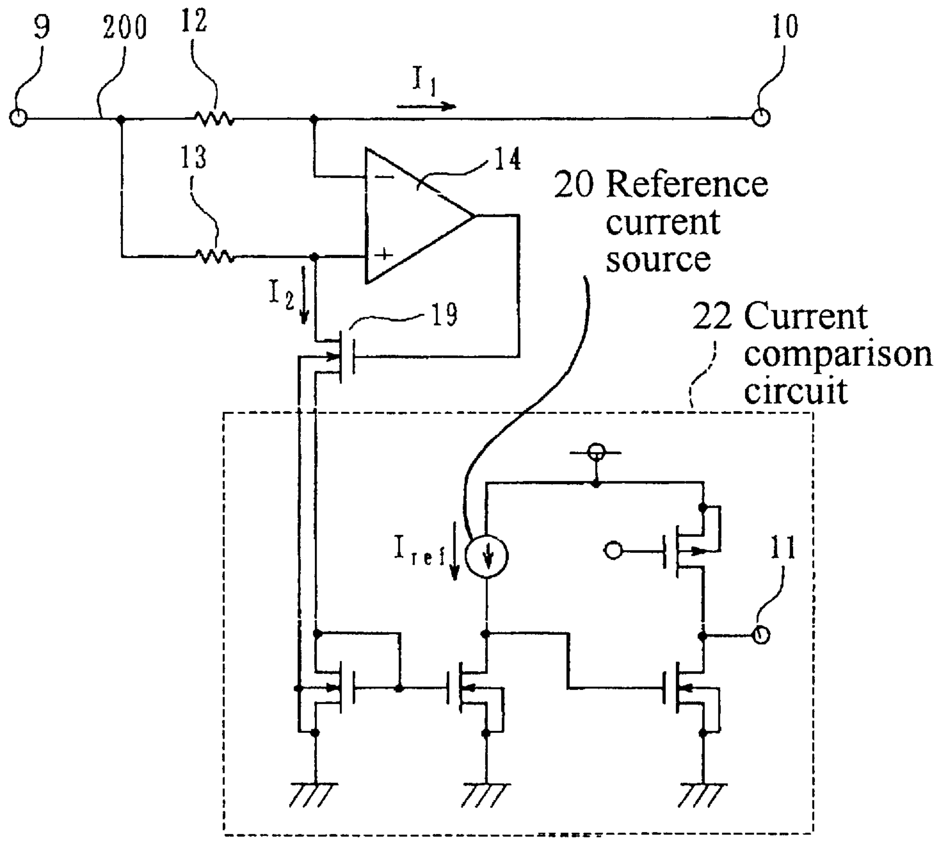
FIG. 5 is a circuit diagram showing a fourth embodiment of the invention.

FIG. 5 shows a fourth embodiment corresponding to an embodiment of the invention as set forth in the fourth aspect.

The circuit for obtaining the proportional current $I_2$ according to this embodiment is the same as disclosed in FIG. 3. This embodiment differs from the second embodiment in that, in the current monitor circuit, a current comparison circuit 22 directly compares the proportional current $I_2$ with the reference current $I_{ref}$, and in that the current comparison circuit detects an overcurrent when the proportional current $I_2$ increases above the reference current $I_{ref}$.

The current comparison circuit 22 in FIG. 5 is simplified and is composed of an N channel MOSFET and a P channel MOSFET.

Figure 6:
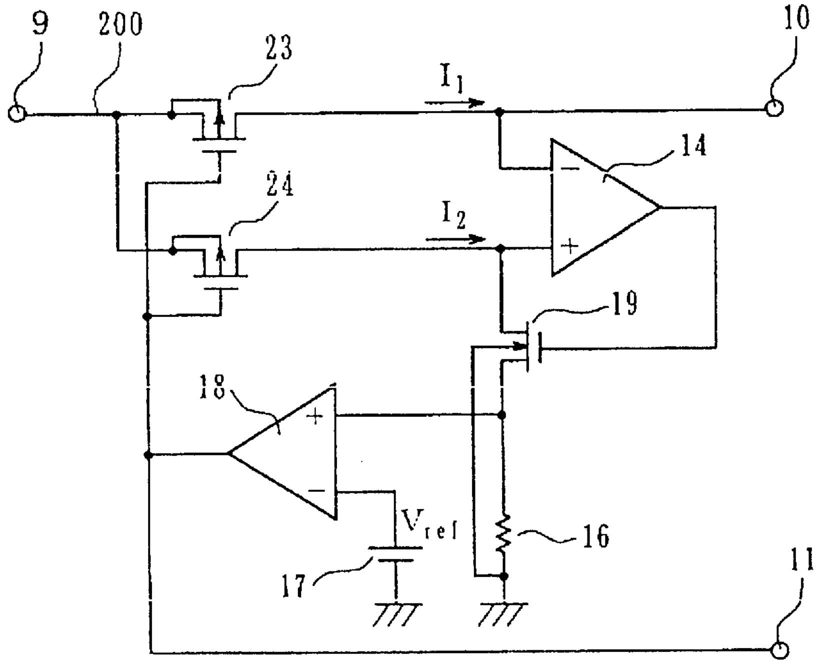
FIG. 6 is a circuit diagram showing a fifth embodiment of the invention.

FIG. 6 shows a fifth embodiment corresponding to an embodiment of the invention set forth in the fifth aspect.

According to this embodiment, a P channel MOSFET switch 23 is used as the first resistance element 4 in FIG. 1, and a P channel MOSFET 24 is used as the second resistance element 5 in FIG. 1 in order to obtain the proportional current $I_2$. The other configuration is almost the same as disclosed in FIG. 3, but the output terminal of the comparator 18 is connected to the gates of the switches 23 and 24.

If the switches comprise MOSFETS, they operate in a linear region when the transistors are turned on and the value of the resistance components remains constant despite variations in a drain-source voltage. That is, the switches have almost the same characteristics as in the passive resistors. In addition, their resistance value is almost proportional to the size of the transistors.

The ratio of the sizes of the switches 23 and 24 is assumed to be expressed in Equation 10. In Equation 10, $(W/L)_{23}$ is a size ratio showing the width/length of the switch 23, and $(W/L)_{24}$ is a size ratio showing the width/length of the switch 24.

$$(W/L)_{24}=1/n\cdot(W/L)_{23} \qquad \text{Equation 10}$$

If the on-resistance of the P channel MOSFET switch 23 is referred to as $r_{m1}$ and the resistance value of the P channel MOSFET switch 24 is referred to as $r_{m2}$, Equation 11 is established between $r_{m1}$ and $r_{m2}$.

$$r_{m2}=n\times r_{m1} \qquad \text{Equation 11}$$

Thus, this embodiment provides the same effect as in the basic circuit in FIG. 1 to enable a current $I_2$ proportional to a current $I_1$ flowing through the power supply line 200 to be obtained. In addition, although the current monitor circuit in this embodiment is identical to that shown in FIG. 3, the output terminal of the comparator 18 corresponding to the overcurrent detection signal is connected to the gates of the P channel MOSFET switches 23 and 24, so that when an overcurrent is detected, the switches 23 and 24 are turned off to interrupt the overcurrent in order to prevent the switches 23 and 24 and other elements from being destroyed.

Figure 7:
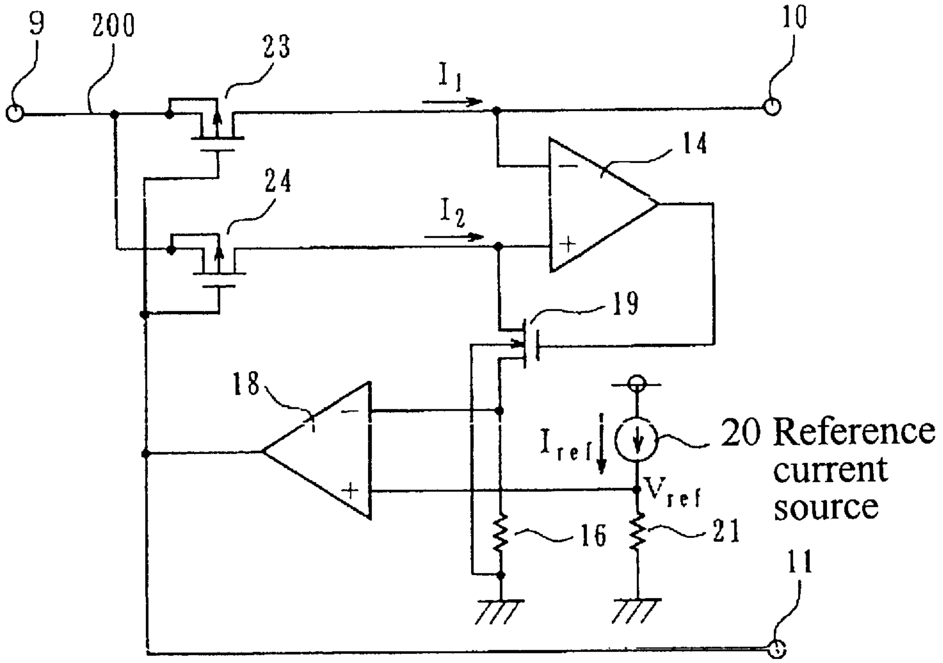
FIG. 7 is a circuit diagram showing a sixth embodiment of the invention.

FIG. 7 shows a sixth embodiment corresponding to an embodiment of the invention as set forth in the eighth aspect.

According to this embodiment, the P channel MOSFET switch 24 is used to obtain a proportional current $I_2$ as in FIG. 6, and the current monitor circuit generates a reference voltage $V_{ref}$ using a reference current source 20 and a passive resistor 21, as in FIG. 4.

According to this embodiment, the output terminal of the comparator 18 is connected to the gates of the switches 23 and 24, so that when an overcurrent is detected, the switches 23 and 24 are turned off to interrupt the overcurrent, as in FIG. 6.

The passive resistors 16 and 21 are made of the same components and have the same temperature characteristics.

Figure 8:
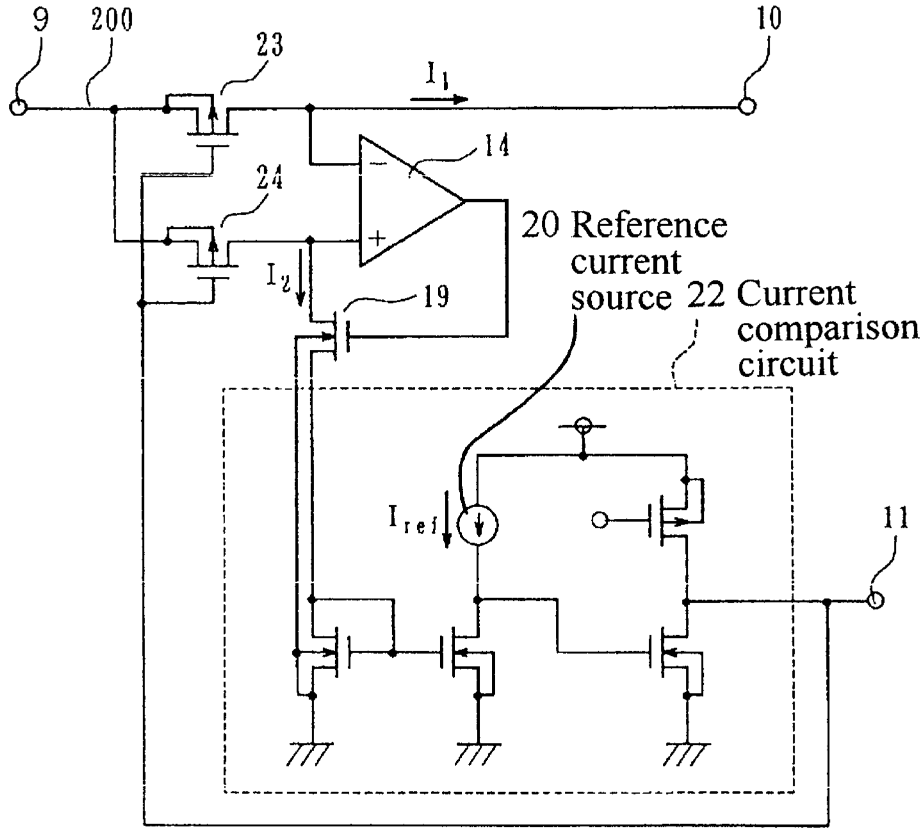
FIG. 8 is a circuit diagram showing a seventh embodiment of the invention.

FIG. 8 shows a seventh embodiment corresponding to an embodiment of the invention as set forth in sixth aspect.

According to this embodiment, the P channel MOSFET switch 24 is used to obtain the proportional current $I_2$ as in FIGS. 6 and 7, and in the current monitor circuit, the current comparison circuit 22 directly compares the proportional current $I_2$ with the reference current $I_{ref}$, as in FIG. 5.

In addition, the overcurrent detection signal output terminal 11 is connected to the gates of the switches 23 and 24, so that when an overcurrent is detected, the switches 23 and 24 are turned off to interrupt the overcurrent.

Figure 9:
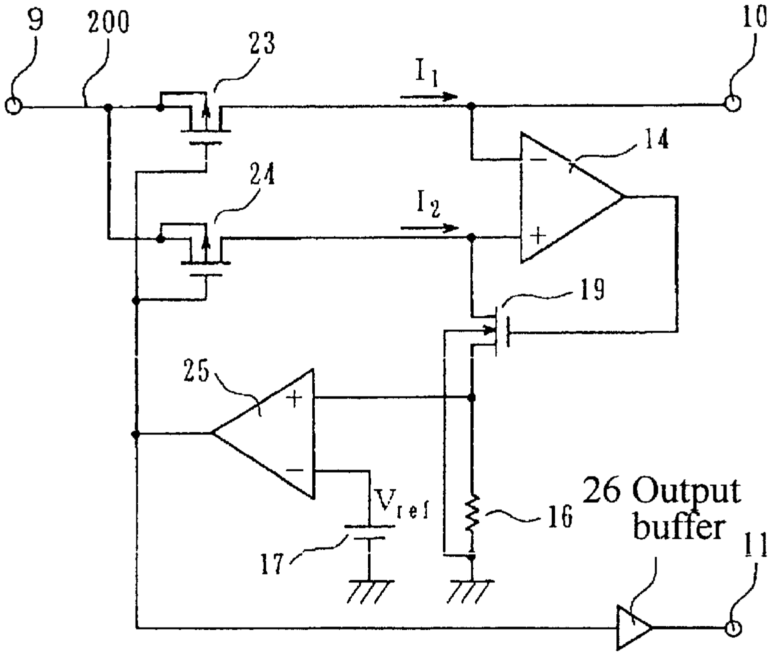
FIG. 9 is a circuit diagram showing an eighth embodiment of the invention.

FIG. 9 shows an eighth embodiment corresponding to an embodiment of the invention as set forth in the seventh aspect.

According to this embodiment, the comparator 18 in the current monitor circuit in FIG. 6 is replaced with a second operational amplifier 25 (the operational amplifier 14 acting as the differential amplifying means is referred to as a first operational amplifier), so that during an overload, it performs a current-restricting function to restrict the current $I_1$ passing through the power supply line 200 to the threshold $I_{over}$ for the overcurrent detection. Reference numeral 26 denotes an output buffer connected between the output terminal of the operational amplifier 25 and the overcurrent detection signal output terminal 11.

When an overcurrent caused by an overload is detected, the feedback operation of the operational amplifier 25 increases the gate voltage of the P channel MOSFET switches 23 and 24 to cause the switches 23 and 24 to shift from a linear-region operation to a saturated-region operation. Thus, despite an increase in a drain-source voltage, the constant current $I_{over}$ flows through the power supply line 200. Thus, the current restriction operation is performed during the overload. This operation is similar to the operation of the constant current limiting described in the prior art section.

The output buffer 26 according to this embodiment prevents the output level of the operational amplifier 25 from reaching the power supply voltage.

Figure 10:
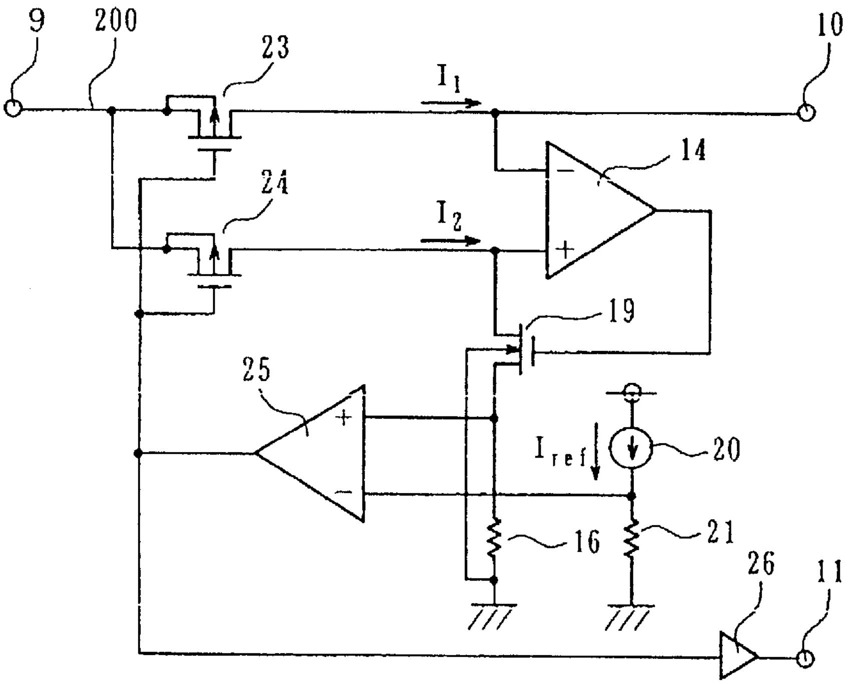
FIG. 10 is a circuit diagram showing a ninth embodiment of the invention.

FIG. 10 shows a ninth embodiment corresponding to an embodiment of the invention as set forth in the eighth aspect.

According to this embodiment, the comparator 18 in the current monitor circuit in FIG. 7 is replaced with the second operational amplifier 25 to provide a current restriction operation similar to that shown in FIG. 9. In addition, the overcurrent detection signal is outputted via the output buffer 26, as in FIG. 9.

This embodiment differs from the embodiment in FIG. 9 in that the reference voltage $V_{ref}$ for the operational amplifier 25 is generated by using the reference current $I_{ref}$ and the passive resistor 21.

Figure 11:
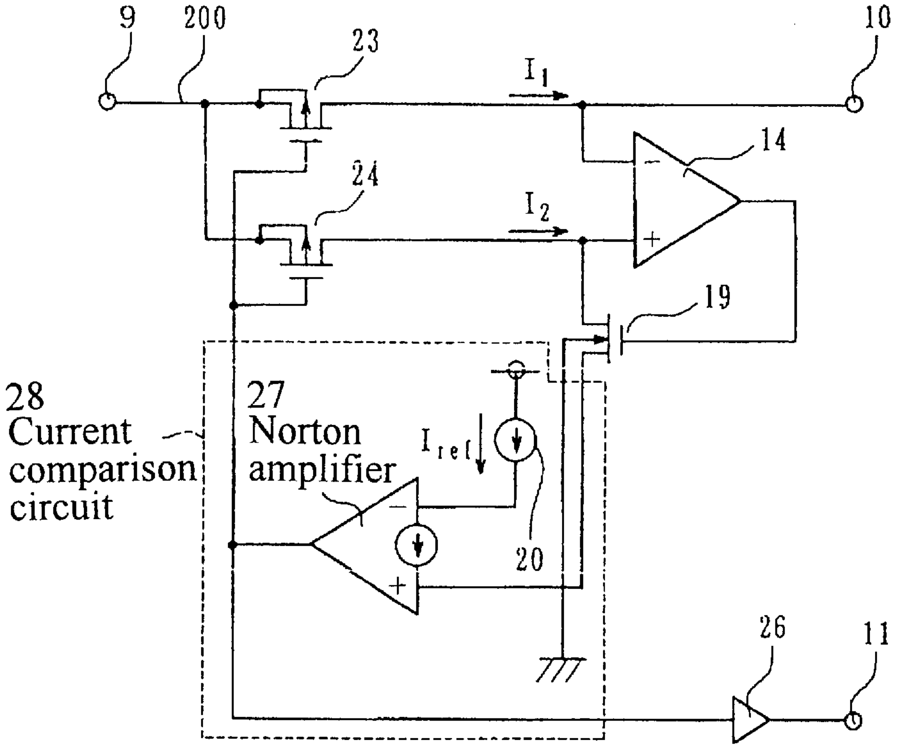
FIG. 11 is a circuit diagram showing a tenth embodiment of the invention.
Figure 12:
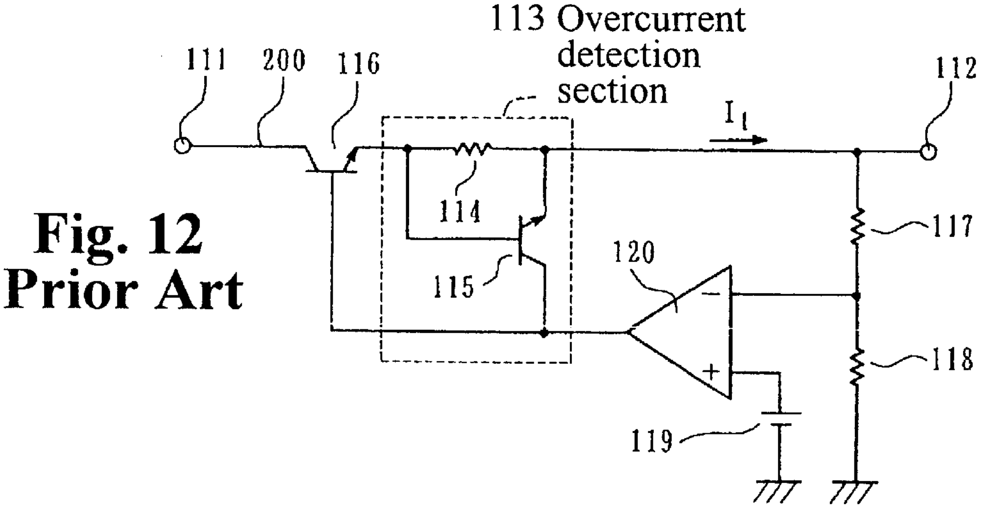
Fig. 12 Prior Art
FIGS. 12–14 are circuit diagrams showing conventional techniques.
Figure 13:
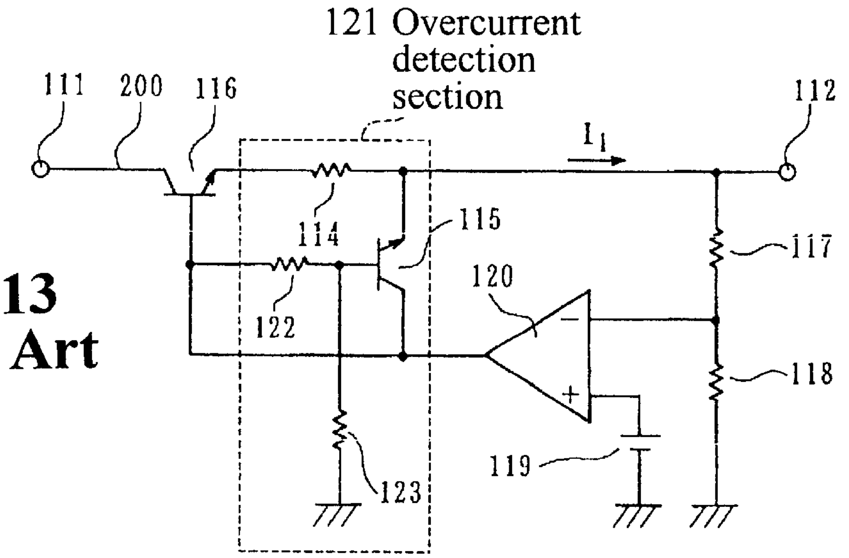
Fig. 13 Prior Art

FIG. 11 shows a tenth embodiment corresponding to an embodiment of the invention as set forth in the ninth aspect.

According to this embodiment, the current comparison circuit 22 in FIG. 8 is replaced with a current comparison circuit 28 using a Norton amplifier 27 in order to provide a current restriction operation similar to that shown in FIG. 9.

In addition, the overcurrent detection signal is outputted via the output buffer 26, as in FIG. 9.

The embodiments in FIGS. 6 to 11 use the on-resistance of the P channel MOSFET switch 23 inserted into the power supply line 200 in order to detect an overcurrent.

In addition, an overcurrent protection circuit has a protection function for forcing the P channel MOSFET switches 23 and 24 to be interrupted by using an output signal from the overcurrent detection circuit in order to prevent the switches 23 and 24 from being destroyed due to the overcurrent.

If a transistor switch having a low on-resistance is inserted into the power supply line 200, the circuits in FIGS. 6 to 11 have both a switching function for power supply and interruption and a switch protection function. Since the loss in voltage drop caused by the switches used for power supply and interruption is determined by the on-resistance of the transistor, the use of a transistor having a very low resistance makes it possible to reduce the voltage drop losses.

As described above, this invention can detect an overcurrent accurately and sensitively even if it uses passive resistors or MOSFET switches having a very low resistance value. This invention can also reduce power losses caused by the voltage drops provided by a regulator or resistors used to detect an overcurrent through a power supply line.

Furthermore, by using an overcurrent detection signal to turn off the MOSFET switch inserted into the power supply line, the overcurrent can be reliably interrupted to protect the elements, such as switches.

What is claimed is:

1. An overcurrent detection circuit for detecting an overcurrent in a current path having first input and output terminals, comprising:

a first resistance element connected between the first input and output terminals of the current path;

a second resistance element having first and second ends, said first end being connected to the first input terminal;

differential amplifying means having second input and output terminals, one of the second input terminals being connected to the first output terminal and the other of the second input terminals being connected to the second end of the second resistance element;

proportional-current output means connected to the second resistance element in series and to the output terminal of the differential amplifying means, said proportional-current output means receiving an output signal from the differential amplifying means to output a proportional current with a magnitude proportional to a current flowing through the first resistance element; and current monitor means connected to the proportional-current output means for monitoring the proportional current outputted from the proportional-current output means to detect an overcurrent flowing through the first resistance element.

2. An overcurrent detection circuit according to claim 1, wherein said first and second resistance elements are first and second passive resistors; said differential amplifying means is an operational amplifier; said proportional-current output means is a transistor with a control terminal, an output signal from the operational amplifier being applied to the control terminal; and said current monitor means has a third passive resistor connected to the proportional-current output means, reference voltage means, and a comparator connected to the third passive resistor and the reference voltage means for outputting an overcurrent detection signal depending on a result of a comparison between a reference voltage of the reference voltage means and a detected voltage obtained by converting the proportional current using the third passive resistor.

3. An overcurrent detection circuit according to claim 2, wherein said reference voltage means has a fourth passive resistor formed of a same component as that of the third passive resistor, said reference voltage being generated by a reference current and the fourth passive resistor.

4. An overcurrent detection circuit according to claim 1, wherein said first and second resistance elements are first and second passive resistors; said differential amplifying means is an operational amplifier; said proportional-current output means is a transistor with a control terminal, an output signal from said operational amplifier being applied to the control terminal; and said current monitor means is a current comparison circuit for outputting an overcurrent detection signal depending on a result of the comparison between the proportional current and a reference current.

5. An overcurrent detection circuit according to claim 1, wherein said first and second resistance elements are first and second MOSFET switches and connected to the current monitor means, said current monitor means providing an overcurrent detection signal and turning the first and second MOSFET switches off in response to the overcurrent detection signal.

6. An overcurrent detection circuit according to claim 5, wherein said differential amplifying means is an operational amplifier; said proportional-current output means is a transistor with a control terminal, an output signal from said operational amplifier being applied to the control terminal; and said current monitor means has reference voltage means for providing a reference voltage, a passive resistor connected to the proportional-current output means, and a comparator connected to the reference voltage means and the passive resistor for outputting the overcurrent detection signal depending on a result of a comparison between the reference voltage and a detected voltage obtained by converting the proportional current using the passive resistor.

7. An overcurrent detection circuit according to claim 5, wherein said differential amplifying means is an operational amplifier; said proportional-current output means is a transistor with a control terminal, an output signal from said operational amplifier being applied to the control terminal; and said current monitor means has reference current means for providing a reference current and a current comparison circuit for outputting the overcurrent detection signal depending on a result of a comparison between the proportional current and the reference current.

8. An overcurrent detection circuit according to claim 5, wherein said differential amplifying means is a first operational amplifier; said proportional-current output means is a transistor with a control terminal, an output signal from said operational amplifier being applied to the control terminal; and said current monitor means has a passive resistor connected to the proportional-current output means, reference voltage means for providing a reference voltage, and a second operational amplifier for outputting the overcurrent detection signal using as input the reference voltage and a detected voltage obtained by converting the proportional current using the passive resistor.

9. An overcurrent detection circuit according to claim 8, wherein said reference voltage means includes reference current means for providing a reference current, and a passive resistor connected to the reference current means and formed of a same component as that of the passive resistor connected to the proportional-current output means, said reference voltage being generated by the reference current and the passive resistor connected to the reference current means.

10. An overcurrent detection circuit according to claim 5, wherein said differential amplifying means is an operational amplifier; said proportional-current output means is a transistor with a control terminal, an output signal from said operational amplifier being applied to the control terminal; and said current monitor means has a current differential amplifier operative for outputting the overcurrent detection signal using as an input the proportional current and a reference current.

* * * * *

UNITED STATES PATENT AND TRADEMARK OFFICE

CERTIFICATE OF CORRECTION

PATENT NO. : 5,892,647

DATED : April 6, 1999

INVENTOR(S) : Kimiyoshi Mizoe

It is certified that error appears in the above-indentified patent and that said Letters Patent is hereby corrected as shown below:

In column 1, line 38, change "line" to --source--;

In column 2, line 43, change "resistor" to --resistance element--;

line 48, change "Other" to --The other--;

In column 3, line 25, change "$V_1 = V_1 - I_1 \cdot r_1$" to --$V_1 = V_i - I_1 \cdot r_1$--;

line 37, change "$V_2 = V_1 - I_2 \cdot r_2$" to --$V_2 = V_i - I_2 \cdot r_2$--;

line 41, change "$V_1 - I_1 \cdot r_1 = V_1 - I_2 \cdot r_2$" to --$V_i - I_1 \cdot r_1 = V_i - I_2 \cdot r_2$--; and In column 7, line 5, change "124" to --114--.

Signed and Sealed this

Twenty-sixth Day of October, 1999

Attest:

Q. TODD DICKINSON

*Attesting Officer* *Acting Commissioner of Patents and Trademarks*